Sept. 24, 1963  J. M. JACKSON, JR  3,104,987

SUCTION HEAD FOR SATURATING FOAM BLOCKS

Filed Jan. 19, 1960  2 Sheets-Sheet 1

INVENTOR.
JAMES M. JACKSON, JR.

BY *Ely, Frye & Hamilton*

ATTORNEYS

Sept. 24, 1963      J. M. JACKSON, JR      3,104,987
SUCTION HEAD FOR SATURATING FOAM BLOCKS Filed Jan. 19, 1960      2 Sheets-Sheet 2

INVENTOR.
JAMES M. JACKSON, JR
BY Ely, Frye & Hamilton
ATTORNEYS

United States Patent Office 3,104,987
Patented Sept. 24, 1963

3,104,987
SUCTION HEAD FOR SATURATING
FOAM BLOCKS
James M. Jackson, Jr., Akron, Ohio, assignor to The
V. L. Smithers Manufacturing Company, Kent, Ohio,
a corporation of Ohio
Filed Jan. 19, 1960, Ser. No. 3,453
4 Claims. (Cl. 118—50)

The invention relates to absorbent foam material used for supporting the stems of cut flowers and supplying them with water. This type of material may be referred to as "floral foam," and is disclosed in U.S. Patent No. 2,753,277, in which the preferred material is phenolformaldehyde resin foam which is substantially non-resilient and frangible to the extent of permitting the insertion of flower stems without deforming the foam; yet the foam is strong enough to support the flower stems in a desired arrangement. Other foams having similar properties may be used.

As stated in said patent, the foamed material is a very slow absorbent, even when immersed in water, and in order to accelerate the saturation of the block it is customarily treated with a chemical wetting agent by the manufacturer. Even when the block is treated with a wetting agent the time necessary to obtain substantially complete saturation of an immersed block is usually from 15 to 60 minutes, and this length of time is objectionable to the florist or flower arranger using the block.

The purpose of the present invention is to provide a novel and improved method and apparatus for saturating a block of floral foam with water, or with water containing a preservative, in a greatly reduced time period without using a wetting agent.

Other objects are to provide a novel saturating apparatus which is adapted to saturate blocks of different sizes throughout their entire volume, which is easily operated by unskilled persons, and which is economical to manufacture.

A further object is to provide an improved method and apparatus using vacuum for saturating a block of foam very rapidly.

The improved apparatus comprises a suction head adapted for sealing contact with a substantial area of a block of floral foam immersed in water and having an enlarged suction chamber for maintaining a high degree of vacuum when connected to a vacuum-producing means to carry out the improved method of the invention.

A preferred embodiment of the improved apparatus is shown by way of example in the accompanying drawings and described in detail in the following specification. Modifications and variations in details are comprehended within the scope of the appended claims.

Figure 1:
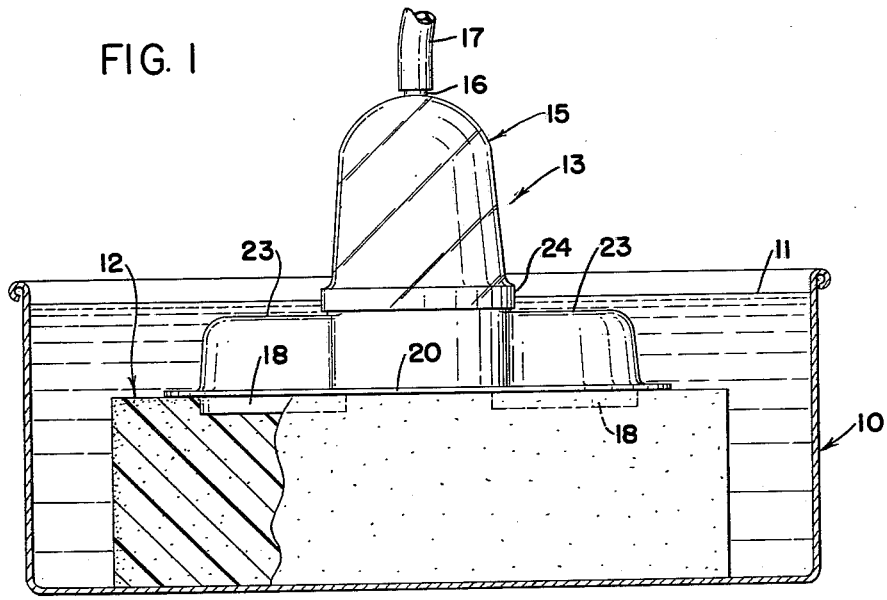
FIG. 1 is a sectional view of a tank of water with a block of foam immersed therein, and showing the suction head in elevation applied to the top of the block.

Referring to FIG. 1, 10 is a tank or open container containing water 11 for saturating a block of foam 12 immersed in the water. The tank is large enough to completely immerse a rectangular block of conventional size, for example 9¼" long, 4½" wide and 3¼" thick, although the tank may vary in size so long as it is substantially larger than the blocks to be immersed.

The foam from which the block is cut is preferably phenolformaldehyde foam or its equivalent, and may be made in accordance with the method disclosed in Patent No. 2,753,277, with the density of the foam controlled to be about 1 to 2 pounds per cubic foot and preferably about 1.5 pounds per cubic foot. At an optimum density of 1.5 pounds per cubic foot, the foam is strong enough to be handled without substantial breakage, and to support flower stems inserted into the foam, while being frangible enough to permit easy insertion of the stems.

The suction head, indicated as a whole at 13, may be made of transparent plastic material comprising preferably two intake or suction openings 14 communicating with a central dome-shaped compartment 15 forming a suction chamber having an outlet neck 16 to which a hose 17 may be connected. The other end of hose 17 is normally connected to a conventional type vacuum pump (not shown). A convenient form of vacuum pump is the ordinary laboratory aspirator type pump which is adapted to be attached to a water faucet and utilizes the water flowing through the faucet to create a partial vacuum in the hose.

Figure 2:
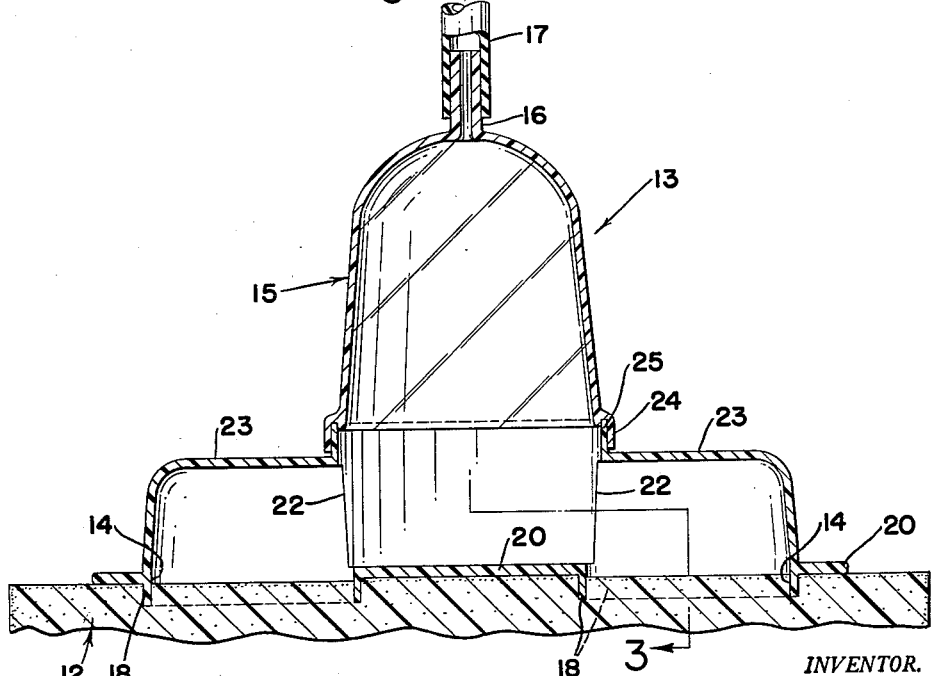
FIG. 2 is an enlarged sectional view of the suction head in sealing contact with the top of a block of foam.
Figure 3:
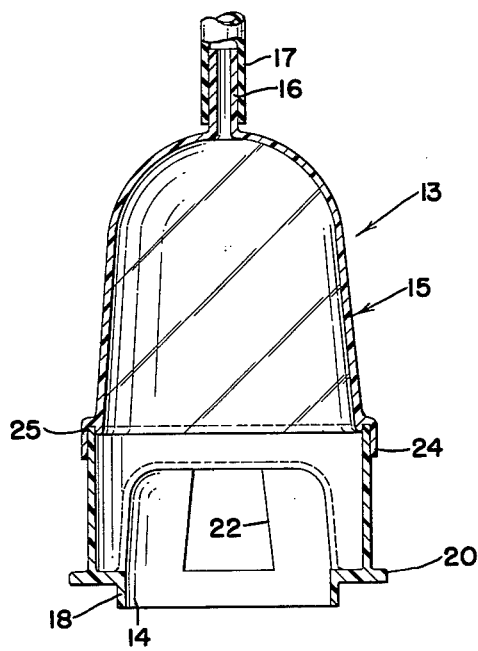
FIG. 3 is a vertical sectional view of the suction head on line 3—3 of FIG. 2.
Figure 4:
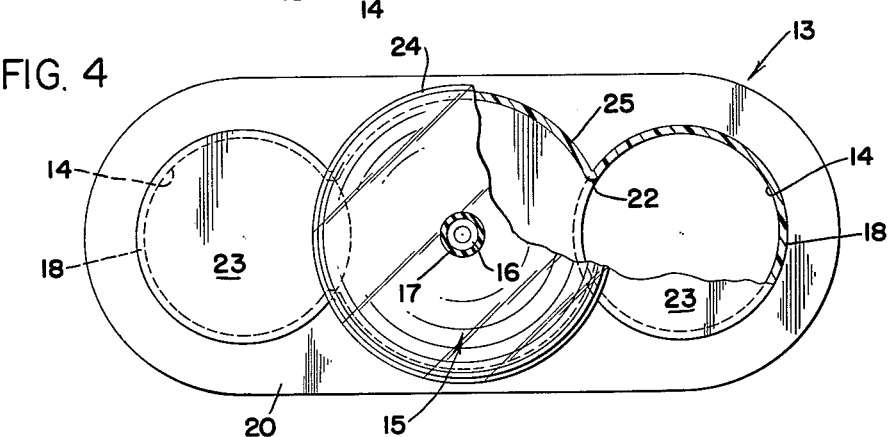
FIG. 4 is a top plan view thereof.

The suction openings 14 are formed by annular flanges 18 depending below a flat base plate 20 which extends under the suction compartment 15 between the two openings 14, and also around the two annular flanges 18. As shown in FIG. 2, when the annular flanges 18 are embedded into the top of the block of foam 12, the flat base plate abuts the top surface of the block and prevents further penetration.

The depth of the annular flanges 18 is determined by several factors. First, the flanges should penetrate sufficiently to provide a good seal with the foam when vacuum is applied. Second, they should not penetrate too deeply into the foam so as to deface or weaken it when removed. Third, they should cling to the foam sufficiently to enable the operator to remove the saturated foam from the water by taking hold of the suction head without putting his hands into the water. An optimum depth of the annular flanges 18 is about ¼", although this may be varied from about ⅛" to ¾" with generally satisfactory results.

The suction openings 14 communicate through ports 22 with the lower part of the suction compartment 15, and preferably the top walls 23 above the suction openings are spaced above the base plate 20 a substantial distance in order to form intake chambers and increase the volume of the suction head. This increased volume, together with the volume of compartment 15, enables attaining a high degree of vacuum and maintaining it for a substantial period of time, which results in substantially reducing the time required for saturating the block and also saturates the block substantially uniformly throughout. The total volume of the suction head should be at least 5 cubic inches and preferably of the order of 25 or 30 cubic inches for optimum results. As shown, the dome-shaped compartment 15 may be formed as a separate piece, having a bottom annular flange 24 telescoped over an annular flange 25 rising from the base 20 and the top walls 23.

Using an aspirator type vacuum pump connected to a faucet with a line pressure of about 65 pounds, a vacuum of about 25" of mercury is obtained with the suction head 13 applied to the top of a block 12 as shown in FIG. 1. By comparison, when the hose was connected directly to two suction openings formed by annular flanges similar to flanges 18, with no substantial volume above the openings, the amount of vacuum attained was only about 10" and the time required to saturate the block was substantially increased. Moreover, there were unsaturated areas at the ends of the block.

The suction head 13 is designed for application to the top of a conventional size block 9¼" x 4½" x 3¼", and optimum results are obtained by making the suction openings about 2¼" in diameter on centers about 4½" apart.

Figure 5:
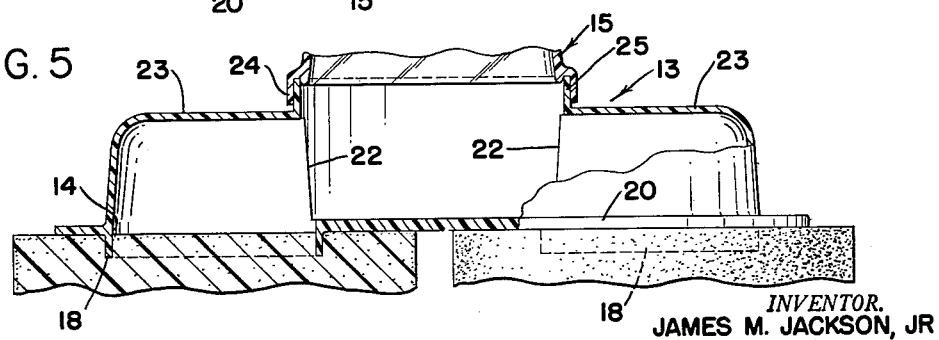
FIG. 5 is a fragmentary view similar to FIG. 2, showing the sealing head applied to two smaller blocks of foam.

Obviously, these dimensions can be varied somewhat while still obtaining satisfactory results. However, the area of each of the two openings should be at least 1¼" square inches for the top of a 9¼" x 4½" block having an area of 41.6". By spacing the centers of the openings about 4½" apart, the suction head is adapted to be applied to two smaller blocks of standard dimensions, for example, a cylindric block about 3⅛" in diameter x 2½" high, as illustrated in FIG. 5. Blocks of these dimensions are used in flower holders for household bouquets, and the like. If it is desired to saturate one of these small blocks at a time, one suction opening 14 can be closed off easily by applying an elastic cover over the flange 18 thereof.

In the operation of the improved apparatus, the suction head is pressed into the top of a block or blocks until the base plate abuts the top surface of the block. The block is then immersed in a container of water such as indicated at 10 by taking hold of the suction head 13. The hose 17 is attached to a suction pump and the pump is operated to draw air through the suction head from the block of foam. As the air is removed from the block of foam, the atmospheric pressure on the water in the tank forces the water into the foam and replaces the air in the multitude of cells or pores of the foam with water. As the block approaches saturation, water begins to flow into the head and, due to the volume of the suction head, the high vacuum of approximately 25" of mercury will be maintained until the whole block is thoroughly saturated. If desired, a floral preservative can be added to the water in the container so that it will be drawn into the block with the water, and thus prolong the life of flowers supported in the block. By having the relatively large dome-shaped suction compartment extending above the openings 22 connected with the intake chambers, it is assured that the high vacuum will be maintained until the block is thoroughly saturated without water being drawn from the block into the hose 17 and decreasing the vacuum.

In actual practice, using a conventional water aspirator attached to an ordinary faucet having a line pressure of 65 p.s.i., a vacuum of about 25" of mercury was obtained and a standard block of foam 9¼" x 4½" x 3¼" at 1.5 pounds per cubic foot density was thoroughly saturated in 20 to 30 seconds. Under the same conditions two smaller pieces of foam 3⅛" diameter x 2½" high were saturated in less than 10 seconds.

The novel apparatus is inexpensive and easy to operate by unskilled persons for saturating blocks of foam in a very short time.

What is claimed is:

1. A suction head for saturating, throughout its entire volume, a block of frangible, synthetic foam consisting of a multitude of thin-walled, air filled cells formed of thin, frangible, homogeneously interconnected walls of material resisting wetting with water and having at least one surface with an area substantially exceeding one and one-quarter square inches, said head having a flat base for contacting said one surface, a flange depending from said base for being embedded into said block, said flange defining at least one opening having an area of at least 1¼ square inches, a suction compartment having a volume of at least 5 cubic inches communicating with said opening, and a suction port in said compartment, the embedment of said flange providing a seal with said block substantially preventing leakage therebetween when a vacuum in the order of 25 inches of mercury is applied to said one opening.

2. A suction head for saturating, throughout its entire volume, a block of frangible, synthetic foam material having at least one surface with an area of the order of 41.6 square inches, said head having a flat base for contacting said one surface, spaced suction openings in said base, depending flanges surrounding said openings for being embedded into said block, the aggregate area of said openings being at least 2½ square inches, a suction compartment having a volume of at least 5 cubic inches communicating with said openings, and a suction port in said compartment.

3. A suction head for saturating, throughout its entire volume, a block of frangible, synthetic foam material comprising a flat base for contacting a surface of the block, a flange depending from said base defining a suction opening and adapted to be embedded into the block to form a substantial seal around said opening, said flat base limiting the extent of embedment of the flange into said block, a suction compartment connected to said opening, and a suction connection communicating with said compartment.

4. A suction head for saturating, throughout its entire volume, a block of absorbent frangible, synthetic foam material comprising a flat base for contacting a surface of the block, flanges depending from said base defining spaced intake openings and adapted to be embedded into the block to form substantial seals around said openings, said flat base limiting the extent of embedment of the flanges into said block, walls forming intake chambers over said openings, a suction compartment between and communicating with said chambers and extending beyond the same, and a suction connection communicating with said compartment.

References Cited in the file of this patent

UNITED STATES PATENTS

| | | |
|---|---|---|
| 1,714,701 | Vannah et al. | May 28, 1929 |
| 1,773,961 | Dance | Aug. 26, 1930 |
| 1,845,775 | Zavertnik et al. | Feb. 16, 1932 |
| 2,236,968 | Cunnington | Apr. 1, 1941 |
| 2,624,063 | Van der Heem | Jan. 6, 1953 |
| 2,753,277 | Smithers | July 3, 1956 |